US008494903B2

(12) United States Patent  (10) Patent No.: US 8,494,903 B2
Silberstein et al.  (45) Date of Patent: Jul. 23, 2013

(54) UNIVERSAL ADVERTISING MODEL UTILIZING DIGITAL LINKAGE TECHNOLOGY "U AD"

(75) Inventors: Eric C. Silberstein, Seattle, WA (US); Evan A. Hill, Bend, OR (US); David J. Cannon, Seattle, WA (US)

(73) Assignee: Activated Content Corporation, Seattle, WA (US)

( * ) Notice: Subject to any disclaimer, the term of this patent is extended or adjusted under 35 U.S.C. 154(b) by 699 days.

(21) Appl. No.: 11/893,648

(22) Filed: Aug. 16, 2007

(65) Prior Publication Data

US 2008/0228575 A1  Sep. 18, 2008

Related U.S. Application Data

(60) Provisional application No. 60/895,278, filed on Mar. 16, 2007.

(51) Int. Cl.
 *G06Q 30/00* (2012.01)
(52) U.S. Cl.
 USPC .............. 705/14.4; 705/14.41; 705/14.46; 705/14.56; 705/14.69; 705/14.72
(58) Field of Classification Search
 None
 See application file for complete search history.

(56) References Cited

U.S. PATENT DOCUMENTS

| | | | |
|---|---|---|---|
| 6,145,081 A | 11/2000 | Winograd et al. | |
| 6,286,100 B1 | 9/2001 | Morimoto et al. | |
| 6,373,970 B1 | 4/2002 | Dong et al. | |
| 6,529,927 B1 | 3/2003 | Dunham | |
| 6,766,062 B1 | 7/2004 | Donoho et al. | |
| 7,013,290 B2 | 3/2006 | Ananian | |
| 7,031,492 B1 | 4/2006 | Furon et al. | |
| 7,070,098 B1 | 7/2006 | Lapstun et al. | |
| 7,298,841 B2 | 11/2007 | Sewell et al. | |
| 2002/0023094 A1* | 2/2002 | Kohda et al. ............... | 707/104.1 |

(Continued)

FOREIGN PATENT DOCUMENTS

| | | |
|---|---|---|
| EP | 0 430 615 B1 | 4/1996 |
| EP | 0 766 468 A1 | 4/1997 |

(Continued)

OTHER PUBLICATIONS

PCT Notification of Transmittal of the International Search Report and the Written Opinion of the International Searching Authority or the Declaration for PCT Counterpart Application No. PCT/US08/73404 Containing International Search Report, 9 pgs. (Nov. 14, 2008).

(Continued)

*Primary Examiner* — Matthew T Sittner
(74) *Attorney, Agent, or Firm* — Blakely, Sokoloff, Taylor & Zafman LLP (57) ABSTRACT

A system and method of providing a linking module to link an identifier to media content in order to create embedded advertising content. A system enabler receives a registration of the identifier and further provides embedded advertising content to be transmitted to a client. The system enabler further provides an extraction module to extract the identifier from the embedded advertising content to allow a client interaction with an advertising experience. The client interactions with an advertising experience are tracked by the system enabler to result in tracked client interactions. After receiving the tracked client interactions, the system enabler compares the tracked client interactions to compensable action items to update an account.

18 Claims, 7 Drawing Sheets

U.S. PATENT DOCUMENTS

| | | | |
|---|---|---|---|
| 2002/0091570 A1* | 7/2002 | Sakagawa | 705/14 |
| 2002/0127532 A1* | 9/2002 | Eimori | 434/350 |
| 2002/0161647 A1 | 10/2002 | Gailey et al. | |
| 2003/0172376 A1 | 9/2003 | Coffin, III | |
| 2003/0185417 A1* | 10/2003 | Alattar et al. | 382/100 |
| 2003/0191941 A1* | 10/2003 | Terada et al. | 713/176 |
| 2003/0192060 A1* | 10/2003 | Levy | 725/133 |
| 2004/0044576 A1* | 3/2004 | Kurihara et al. | 705/14 |
| 2004/0107137 A1 | 6/2004 | Skinner | |
| 2004/0169581 A1* | 9/2004 | Petrovic et al. | 340/5.2 |
| 2004/0255123 A1* | 12/2004 | Noyama et al. | 713/176 |
| 2005/0251683 A1* | 11/2005 | Levy et al. | 713/176 |
| 2006/0020510 A1 | 1/2006 | Vest | |
| 2006/0080538 A1* | 4/2006 | Kusuda et al. | 713/176 |
| 2006/0116924 A1* | 6/2006 | Angles et al. | 705/14 |
| 2007/0053325 A1* | 3/2007 | Shin et al. | 370/335 |
| 2007/0146797 A1* | 6/2007 | Sakai et al. | 358/3.28 |
| 2007/0150353 A1* | 6/2007 | Krassner et al. | 705/14 |
| 2007/0156594 A1* | 7/2007 | McGucken | 705/51 |
| 2008/0109369 A1* | 5/2008 | Su et al. | 705/59 |

FOREIGN PATENT DOCUMENTS

| | | |
|---|---|---|
| EP | 0 828 372 A2 | 3/1998 |
| EP | 0 891 071 A2 | 1/1999 |
| EP | 0 905 967 A1 | 3/1999 |
| EP | 1 037 442 A2 | 9/2000 |
| GB | 2 343 818 A | 5/2000 |
| GB | 2 348 028 A | 9/2000 |
| JP | 57-147695 | 9/1982 |
| JP | 57-185090 | 11/1982 |
| JP | 03-167600 | 7/1991 |
| JP | 09-191394 | 7/1997 |
| JP | 10-164349 | 6/1998 |
| JP | 11-212463 | 8/1999 |
| JP | 11-284836 | 10/1999 |
| WO | WO 96/42151 A2 | 12/1996 |
| WO | WO 97/33391 A1 | 9/1997 |
| WO | WO 98/53565 A1 | 11/1998 |
| WO | WO 99/17536 A1 | 4/1999 |
| WO | WO 00/04662 A1 | 1/2000 |

OTHER PUBLICATIONS

Swanson et al., "Robust Auto Watermarking Using Perceptual Masking", Elsevier Signal Processing (1998)[online], [retrieved on Jan. 15, 2010], retrieved from Google Scholar.

PCT International Search Report, International Application No. PCT/GB01/03391, mailed Oct. 25, 2002, 7 pages.

First Office Action for Chinese counterpart application No. 200880107290.2, dated Aug. 4, 2011, 12 pages.

International Preliminary Report on Patentability for counterpart application No. PCT/US2008/073404, dated Feb. 16, 2010, 6 pages.

\* cited by examiner

UNIVERSAL ADVERTISING MODEL UTILIZING DIGITAL LINKAGE TECHNOLOGY "U AD"

CROSS-REFERENCE TO RELATED APPLICATIONS

This application claims priority from U.S. Provisional Patent Application No. 60/895,278, filed on Mar. 16, 2007, all of which is incorporated herein by reference in its entirety.

This application is related to U.S. patent application Ser. No. 10/343,145 entitled "STEGOTEXT ENCODER AND DECODER," by Sewell, et al., filed on Aug. 28, 2003, which is hereby incorporated herein by reference.

BACKGROUND OF THE INVENTION

1). Field of the Invention

Embodiments of this invention relate to a universal advertising model that provides greater flexibility in the creation, tracking, and compensation of advertisements.

2). Discussion of Related Art

Online advertising has become ubiquitous in internet and computer network environments. Consumers can access a myriad of marketing and promotional content through the use of their home computers and web browsers.

Much of the advertising experienced by consumers come in the form of pop up ads or banner ads. However, these ads are not personalized to a specific client with specific interests nor are they specialized for specific niche markets.

Product companies, or their authorized agents, pay for advertisements to be created, often before knowing whether the advertising is successful or not. The advertising is produced in house or on an outsourced contract basis. Product companies tend to work with a handful of advertising agencies to work hand-in-hand to shape advertisements.

These advertisements are often based on preconceived markets with a limited amount of niche differentiation. The product company maintains ultimate control over each advertisement including branding considerations. When a local retailer carries a product, it creates advertisements for those products but the product company still maintains ultimate control over the advertisements.

Advertisements are distributed by the product company on a paid basis where the product company pays fees to have its advertisements placed. The advertisements are often associated with mainstream, well understood content rather than niche markets that the product company does not know about.

As a result, product companies are limited in their ability to sell to multiple niche markets unless those niches are large enough to be noticeable and to justify the advertising money.

BRIEF DESCRIPTION OF THE DRAWINGS

The invention is described by way of examples with reference to the accompanying drawings, wherein.

DETAILED DESCRIPTION OF THE INVENTION

Figure 1:
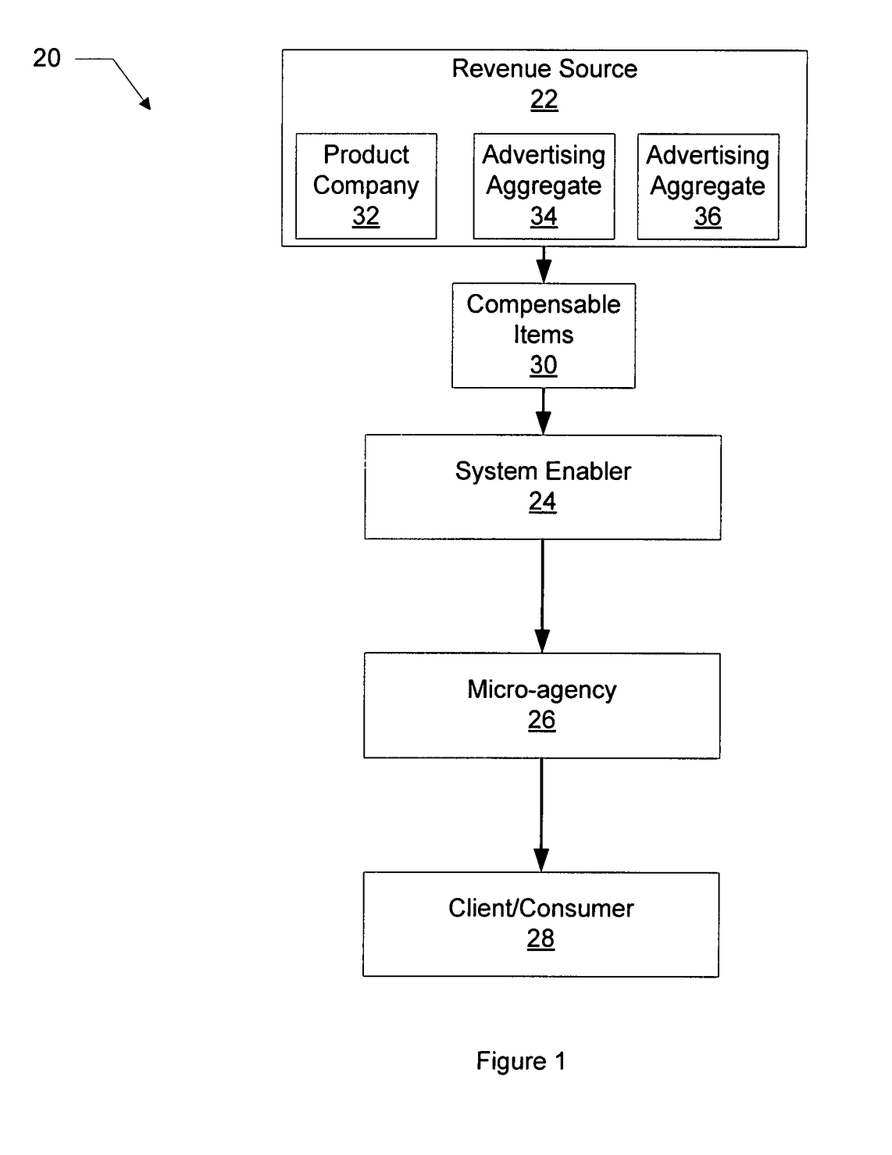
FIG. 1 is a diagram illustrating the system components of an advertising linking model.

FIG. 1 of the accompanying drawings illustrates an advertising linking model 20 having a revenue source 22, system enabler 24, micro-agency 26, client 28, and compensable items 30.

Figure 2A:
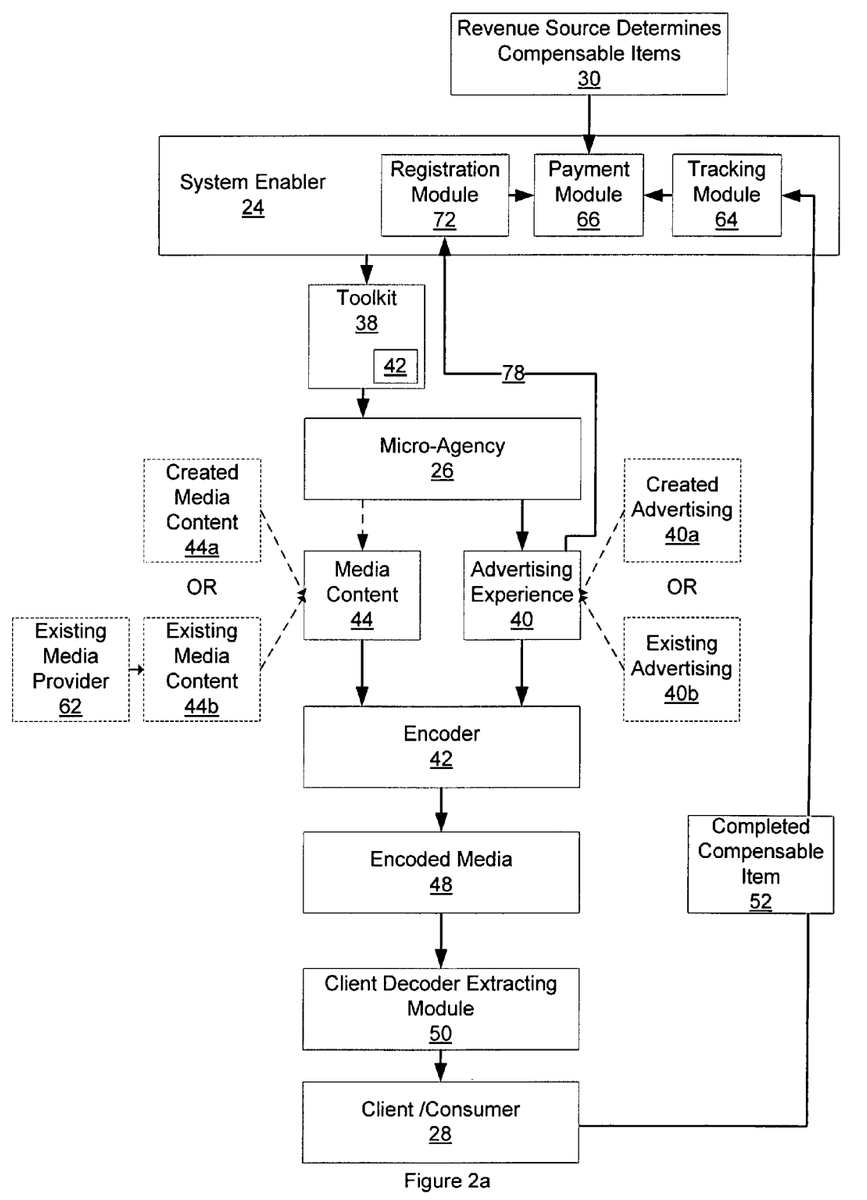
FIG. 2a is a diagram illustrating a system enabler interacting with the system components of the advertising linking model.
Figure 2B:
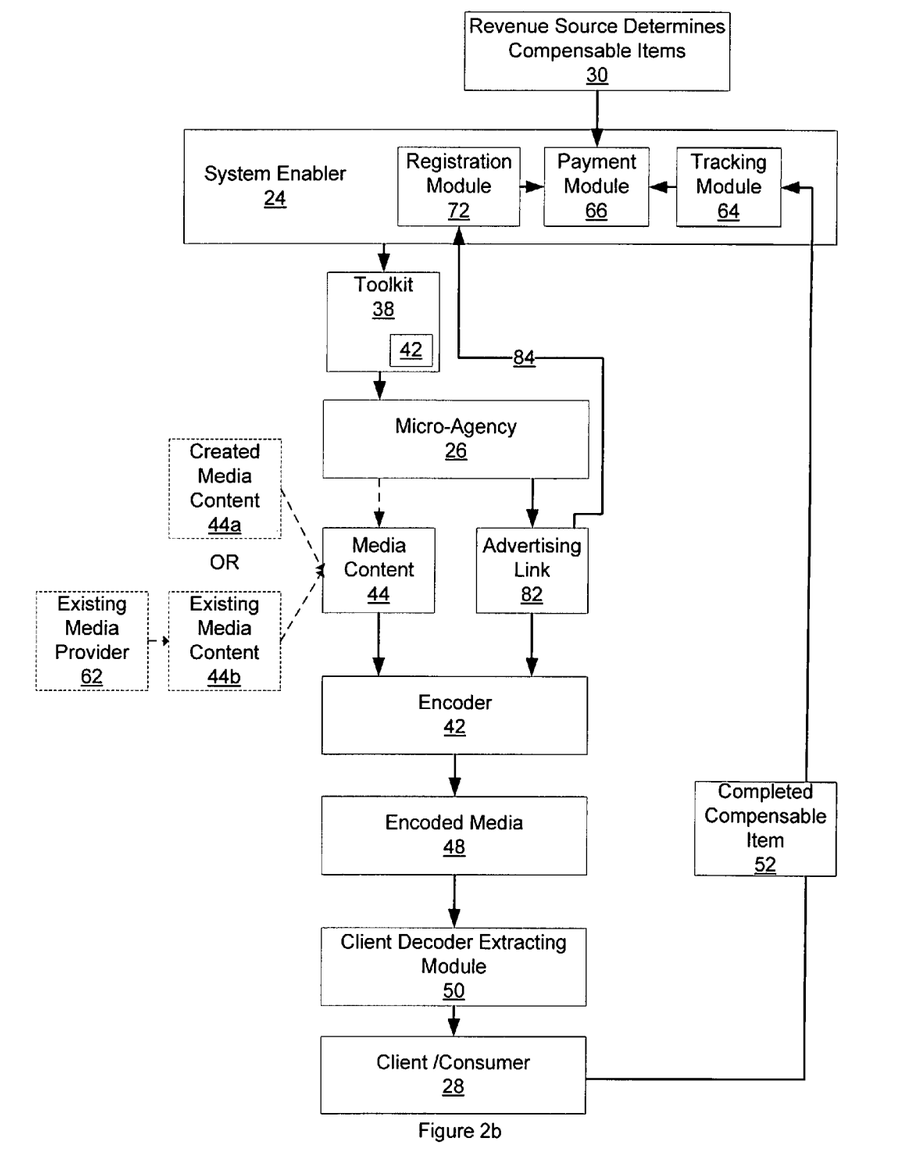
FIG. 2b is a diagram illustrating a system enabler interacting with the system components of the advertising linking model according to another embodiment of the invention.
Figure 3:
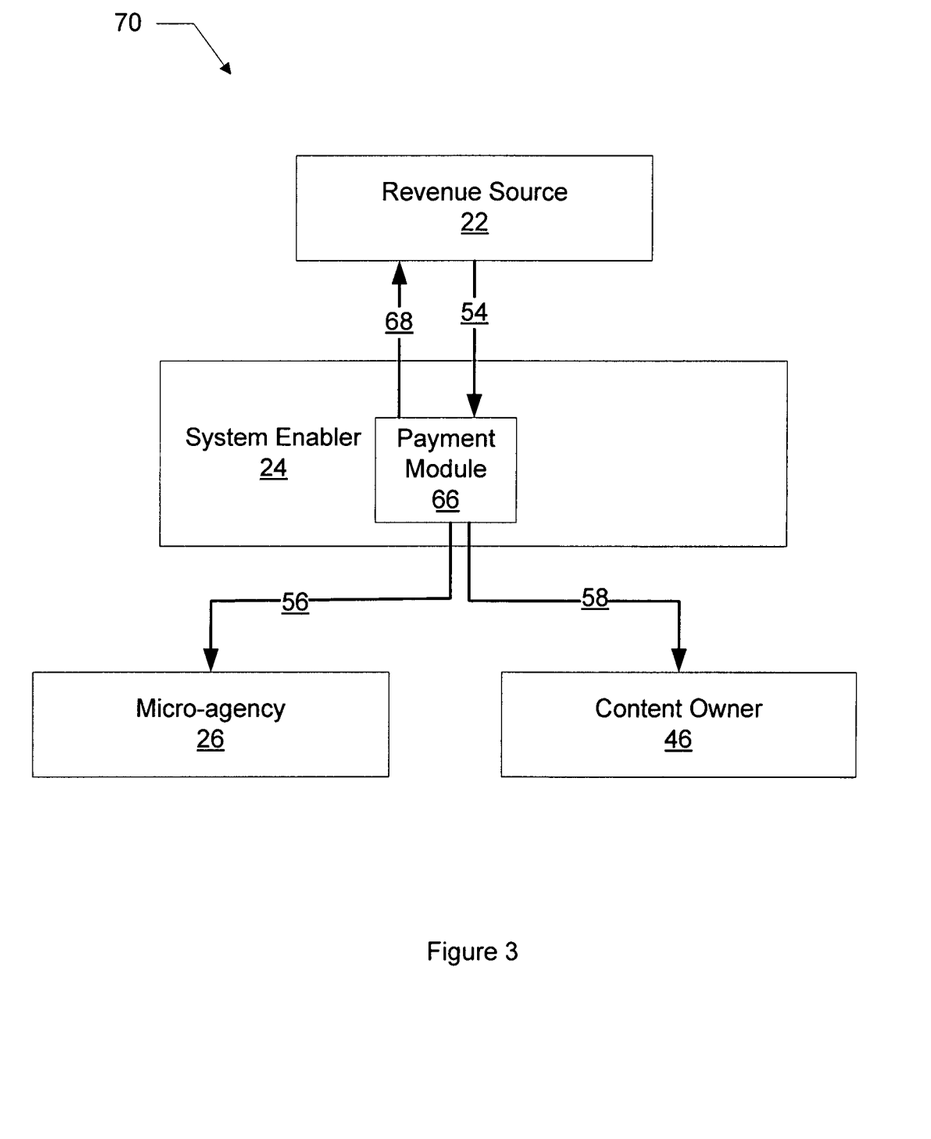
FIG. 3 is a diagram illustrating a compensation system facilitated by the system enabler.

The system of an advertising linking model 20 is first described with respect to FIGS. 1 to 3, where after its functioning is described.

FIG. 1 shows a revenue source 22 which provides compensable items 30 to the system enabler 24. The revenue source 22 can be a product company 32 that is interested in advertising a specific product or service while maintaining branding considerations. Also, the revenue source 22 can be an advertising aggregator 34 which is an entity that collects or distributes advertisements as they see fit. Furthermore, the revenue source 22 can also be an affiliate network 36 which is a product sales outlet that has the necessary infrastructure to tie an advertising referral by an affiliate all the way through to an actual transaction. The affiliate's compensation for the successful advertisement placement is a percentage of the sale of the product or service. It is appreciated that the revenue source 22 can also be any known revenue provider with respect to advertising, such as an advertising agency.

The revenue source 22 provides compensable items 30 which are action items that a revenue source 22 agrees to pay for. The compensable items 30 are defined before the compensable items 30 are actually completed. For instance, action items that may be considered compensable items 30 include advertising impressions, click-throughs, and purchases. An advertising impression is generally defined as a distinct advertisement viewed by a consumer or client 28. An impression can be any action that could be construed as consuming or acting on the advertisement including but not limited to an immediate sensory display or time shifted sensory displays. Furthermore, impressions can also include client 28 actions such as the printing of an ad, saving an ad to a location, searching for the product advertised, or transmitting the advertisement to another client or consumer 28. A click-through is a trackable instance of a consumer 28 viewing an advertisement and seeking more information by clicking on the advertisement. Client or consumer 28 purchases can also qualify as compensable items 30 for which a revenue source 22 would be willing to pay a system enabler 24. Other behavior performed on behalf of a consumer or client 28 through an automated agent can also be considered enough to qualify as a compensable item 30.

FIG. 2a shows the system enabler 24, collecting the compensable items 30 from the revenue source 22, which can be stored in a data base, reference list, or a payment module 66. The system enabler 24 maintains the contractual relationship with any entity providing performance based advertising compensation including the revenue sources 22. Based on these relationships, the system enabler 24 collects compensation for advertisements 40 and apportions it appropriately between micro-agencies 26 and content owners 46 as described in further detail.

The system enabler has a tracking module 64, a payment module 66, and a registration module 72. The tracking module 64 keeps track of client or consumer 28 interactions with the advertising experience 40. The payment module 66 monitors which compensable items 30 have been completed and conducts payment requests 68 and allocations.

The system enabler 24 also provides an advertising toolkit 38 to a micro-agency 26. The advertising toolkit 38 is a collection of tools that allow micro-agencies 26 to create advertising experiences 40. The toolkit 38 can be stand alone software, plug-ins, or enhancements to existing authoring tools. The toolkit 38 can be an online program, downloaded to the client 28, or loaded by the client 28 through peripheral devices. The toolkit 38 can also contain a watermark encoder 42 that is necessary to associate advertisements 40, through watermarking, with media content 44. The media content 44 can be audio and video streams, textual and graphical information or documents, images, and image content. The media content 44 can be stored on computer-readable media such as a hard drive, disk, compact disk, digital video disk, or volatile or nonvolatile memory. Also, the media content 44 can be transmitted by digital or analog broadcasting or streaming over a wired or wireless connection or link. For instance, media content 44 can be a song on a CD track or downloaded from the internet. It is appreciated, however, that the watermark encoder 42 can be separate from the toolkit 38 and can be downloaded or pre-installed on a personal computer, computer, mobile device, or audio capable consumer electronic device that is acquired separately from the toolkit 38.

The micro-agency 26 is any individual or organization, such as a corporation, which can produce freelance "user generated" advertisements 40a by, among other methods, watermarking advertising messages 40 into their own media content 44a or into pre-existing media content 44b provided by an existing media content provider 62. Also, the micro-agency 26 can utilize an already existing advertisement 40b to be watermarked into the media content 44.

The grafting of an advertising message 40 is accomplished by watermarking or other processes in which data is added to a main signal in a way that does not interfere with the purpose of the main signal. Watermarking is a method of inserting digital information into a source piece of analog information in such a way that it becomes an indelible part of the source analog information. Metadata file information can be included in the digital information that is encoded into the media content 44. The metadata file information can be used to track which micro-agency 26 the watermark originated from and can also contain information related to the system enabler 24.

A micro-agency 26 can produce an advertisement 40 regardless of whether or not a pre-existing relationship is present with the revenue source 22. Instead, micro-agencies 26 interact with the system enabler 24 rather than directly with the revenue source 22. Micro-agencies 26 embed advertisement experiences 40 within media content 44 without prior knowledge or approval by the content owners 46. The content owner 46 is an individual or organization who owns the legal rights to a piece of media content 44.

As a result, the micro-agencies 26 have a greater degree of flexibility in creating advertising experiences 40 that would target explosive niche markets while benefiting both the revenue source 22 and the content owner 46. For example, if a certain piece of media content 44 becomes wildly popular on the internet for a short period of time, a micro-agency 26 can take advantage of the popularity by creating advertising experiences 40a relevant to the existing media content 44b by utilizing toolkit 38 and encoder 42. It is appreciated that any entity, including but not limited to a micro-agency 26, can place an advertisement 40 into association with the media content 44 of its choice via the use of watermarking.

FIG. 2a shows an advertising experience 40 combined with media content 44 into an encoder 42 resulting in encoded advertising media content 48. A consumer, client 28, or any entity capable of viewing either media content 44 or advertisements 40, consumes the media content 44 in an environment capable of decoding the encoded advertising and media content 48. Again, the advertisements can be originally produced by the micro-agency 26, or composed of pre-existing "ad widgets". The advertising experience 40 can be sent directly to a client or consumer 28 without being encoded into media content 44 by encoder 42 in another embodiment of the invention. Encoding an advertising experience 40 into media content 44 is not required when the advertising experience 40 and the media content 44 are already both combined into one file or location.

FIG. 2a further shows the advertising experience 40 being reported 78 to the system enabler 24 and input into a registration module 72. The reporting or registering of the advertising experience 40 allows the system enabler 24 to track the location of the advertising experience 40 and also monitor the quality and content.

The system enabler 24 is responsible for maintaining advertisements 40 generated in an effort to induce action items that can qualify as completed compensable items 52. The system enabler 24 is also responsible for maintaining the relationship between the watermark in the media content 44 and the appropriate advertisement 40 through the use of the registering module 72. Furthermore, the system enabler 24 is responsible for capturing and tracking all of the interactions between the consumer or client 28 and the advertisement 40 as discussed in detail below.

FIG. 2a also shows the client decoder or extracting module 50, decoding an encoded advertising media transmission 48 for viewing by the client 28. The client 28 can then have interactions as described above with the advertising experience 40, resulting in completed compensable items 52. The advertising experience 40 is the context in which a consumer or client 28 interacts with the advertisements 40 which is subsequently tracked by the system enabler 24 through the tracking module 64. The tracking module 64 tracks completed compensable items 52 or even other actions by the client that may not be considered compensable. The advertisement experience 40 includes, but is not limited to, the software necessary to recover a watermark and resolve the watermark code to the appropriate advertisement 40. The decoder 50 can be downloaded, pre-installed on a personal computer, computer, mobile device, or audio capable consumer electronic device. The decoder 50 can also be installed through peripheral devices, or acquired through advertising campaigns.

The client decoder or extracting module 50 can be a type of decoder 50 that relies upon a fast Fourier transformation and rectangular polar conversion of a signal so as to transform the signal into a log power spectrogram domain. Positive and negative multiples of keys are subtracted from the log power domain and then evaluated based on a predetermined statistical model to decode the signal. The encoder 42 and decoder 50 can be of the type found in U.S. patent application Ser. No. 10/343,145, the contents of which are hereby incorporated by reference.

FIG. 2a also shows a payment module 66 comparing the tracked information 52 in the tracking module 64 to compensable items 30 provided by the revenue source 22. The payment module 66 then determines if there is a match and whether any compensable items 30 have been completed in order to warrant compensation. The registration module 72 informs the payment module 66 which micro-agency 26 is responsible for the advertising experience 40 and whether the completed compensable item 52 is still valid for compensation.

FIG. 2b shows a similar system according to another embodiment where the entire advertising experience 40 is not watermarked into the media content 44. Rather, an advertising link 82, such as a uniform resource locator (URL), is embedded into the media content 44 by the micro-agencies 26 through watermarking. Thus, a unique instance of the media content 44 is watermarked with a code 82 that refers to the associated advertisement 40. The advertising link 82 is registered 84 with the registration module 72 of the system enabler 24. Instead of only registering the advertising link 82 or advertising experience 40, in another embodiment, the encoded advertising media 48 can be reported to the system enabler 24 after having an advertising experience 40 or an advertising link 82 embedded into the media content 44.

When a client or consumer 28 decodes the encoded media content 48, the watermark executes the link 82 and opens an advertising experience 40. The advertising experience 40 can be newly created advertising 40a or existing advertising 40b. If the advertising link 82 is a URL, the advertising experience 40 can be in the form of a web page or viewing environment that is launched with specific products or services related to the media content 44. The client 28 interaction with the viewing environment or advertising experience 40 is reported to the system enabler 24 so that the information can be tracked by a tracking module 64.

FIG. 3 shows a compensation system 70 based on completed compensable items 52 that match the original compensable items 30. After a match is determined, the system enabler 24 sends a payment request 68 to the revenue source 22. The revenue source 22 then provides payment 54 based on a pre-existing agreement. However, the compensation request 68 does not need to be initiated by the system enabler 24. In many cases, the payment or compensation 54 can be initiated by the revenue source 22 based on their own tracking mechanisms. The payment 54 is distributed by the system enabler 24 to the micro-agencies 26 and content owners 46. The micro-agency 26 receives a payment 56 while the content owner 46 can also receive payment 58. Payments 54, 56, 58 can be in the form of monetary compensation, credits, points, or any measure of value.

Figure 4A:
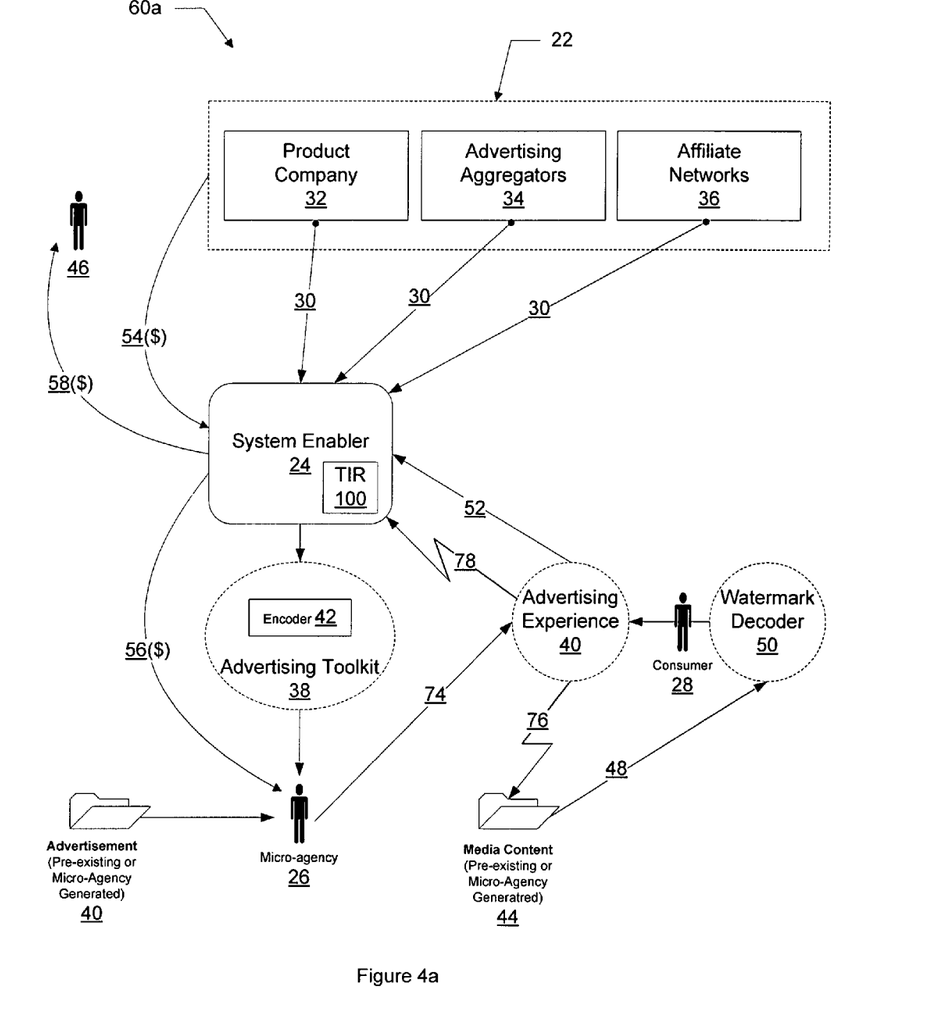
FIG. 4a is a diagram illustrating a universal advertising system wherein the compensation system and the advertising linking model are implemented.

In use, FIG. 4a illustrates a universal advertising system 60a and a process by which the system enabler 24 facilitates payments from the revenue source 22. The revenue source 22 provides compensable items 30 to the system enabler 24. The system enabler 24 then provides a toolkit 38 which contains an encoder 42 to micro-agencies 26. The encoder 42 allows an advertising experience 40 to be embedded into the media content 44 via the use of watermarking or other technologies. The micro-agencies 26 then create 74 an advertising experience 40a or acquire existing advertising 40b, and encode 76 the advertising experience 40 into the media content 44. As previously mentioned, the media content 44 can be created by the micro-agency 26 or can be provided by a media provider 62. The micro-agencies 26 watermark the advertising experience 40 into the media content 44 by using the encoder 42 that is provided in the toolkit 38 or downloaded from the internet.

The advertising experience 40 is registered or reported 78 to the registration module 72 within the system enabler 24 for tracking and maintenance purposes. The encoded advertising media 48 is distributed to clients or consumers 28 who can distribute the encoded advertising media 48 within their own social networks 80.

When the consumer or client 28 receives the encoded advertising media content 48, a client decoder 50 or extracting module decodes the embedded advertising experience 40 and displays the advertisement 40 so the client or consumer 28 can engage in the advertising experience 40 and produce completed compensable items 52. Meanwhile, the system enabler 24 is able to track client or consumer 28 interactions with the advertising media 40 such as by observing impressions, click-throughs, and purchases with a tracking module 64. The client 28 interactions send a signal to the tracking module 64 for storing in a location. The signal can be a completed compensable items 52 or metadata file information informing the system enabler 24 who the encoded watermark originated from. The system enabler 24 can assemble triggered information reports (TIR) 100 on the basis of logged events. The TIR 100 can be any combination of information that can be derived from an intersection or subset of user identification, watermark identification, viewing device identification, and advertising experience identification information. TIRs 100 can be created by an electrical signal carrying processor implementable instructions for controlling a processor to create triggered information reports 100. The electrical signal carrying instructions can be stored on a storage medium such as a hard drive or any known storage device.

FIG. 3 shows the payment module 66, in the system enabler 24, comparing the tracked information in the tracking module 64 to compensable items 30 provided by the revenue source 22 and any other metadata file information. The payment module 66 determines if there is a match and whether any compensable items 30 have been completed.

As previously mentioned, the system enabler 24 maintains a contractual relationship with any entity providing performance based advertising compensation. These entities may include the revenue sources 22 such as product companies 32, advertising aggregators 34, affiliate networks 36, or other advertising agencies. After a request 68 for payment is received, the revenue source 22 compensates the system enabler 24 for compensable items 30 that have been completed by a payment 54.

FIG. 4a further shows the system enabler 24 redistributing payment 56 to micro-agencies 26 based on the successful completion of compensable items 30 made possible by the advertising experience 40 and media content 44 linked by the micro-agencies 26. In other words, the micro-agency 26 is compensated for its work in creating the advertising 40 and linking the advertising 40 to media content 44 based on how many clients or users 28 interacted with the advertising experience 40. The payments 56 distributed to the micro-agencies 26 can be monthly apportioned or instant payments. The system enabler 24 can also make a payment 58 to the content owner 46 based on any contractual agreements that exist. The content owner 46 and the micro-agency 26 can be the same entity depending on who owns the media content 44.

The system enabler 24 retains a portion of the payment 54 from the revenue source 22 as compensation for the services and products provided to the micro-agency 26. The percentage of the payment 54 retained by the system enabler 24 can be any percentage, such as 10%, depending on the cost of services and products provided by the system enabler 24.

Figure 4B:
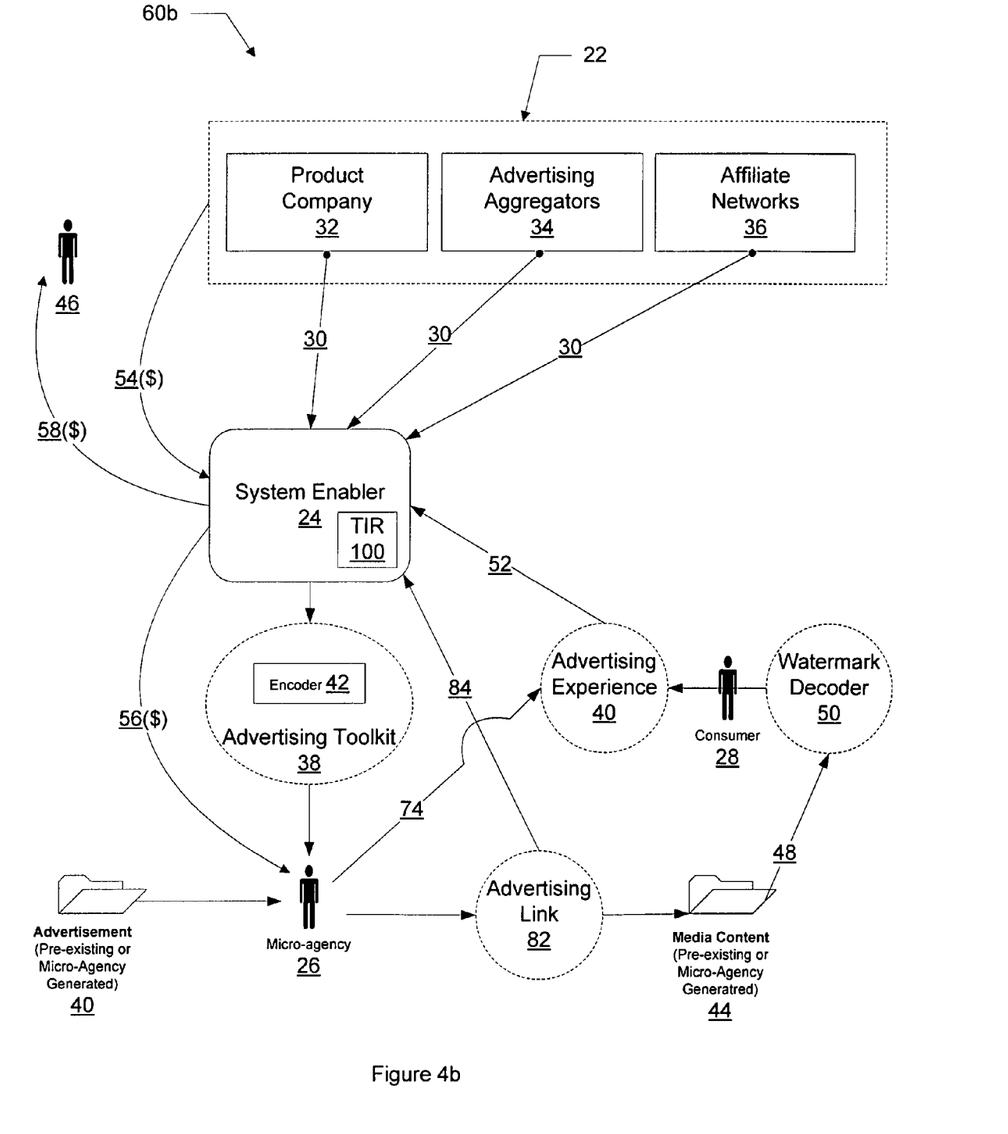
FIG. 4b is a diagram illustrating a universal advertising system wherein the compensation system and the advertising linking model are implemented according to another embodiment of the invention.

FIG. 4b shows a universal advertising experience system 60b according to another embodiment where the micro-agency 26 encodes an advertising link 82 into the media content 44. The system 60b allows the encoding process to be faster and more efficient given an advertising link 82 is embedded into the media content 44, instead of an entire advertising experience 40. The advertising experience 40a can still be created by the micro-agency 26, however, only a link 82 is watermarked into the media content 44 for connecting the consumer or client 28 to the advertising experience 40. The advertising link 82 being watermarked is also reported 84 to the system enabler 24 for tracking purposes.

When the client or consumer 28 opens the media content 44, the encoded media 48 communicates to the client's computer, mobile device, or audio capable consumer electronic device ordering the central processing unit (CPU) to look for an advertising link 82 or URL. The computer, mobile device, or audio capable consumer electronic device opens a web page or viewing environment associated with the advertising link 82 or URL and enables the client or consumer 28 to engage in compensable interactions with the advertising experience 40. Also, metadata file information can be encoded along with the advertising link 82 into the media content 44, to keep track of where the watermark originated or whether the watermark is current and valid. Again, the system enabler 24 can create a TIR 100 based on logged information as previously described.

Figure 5:
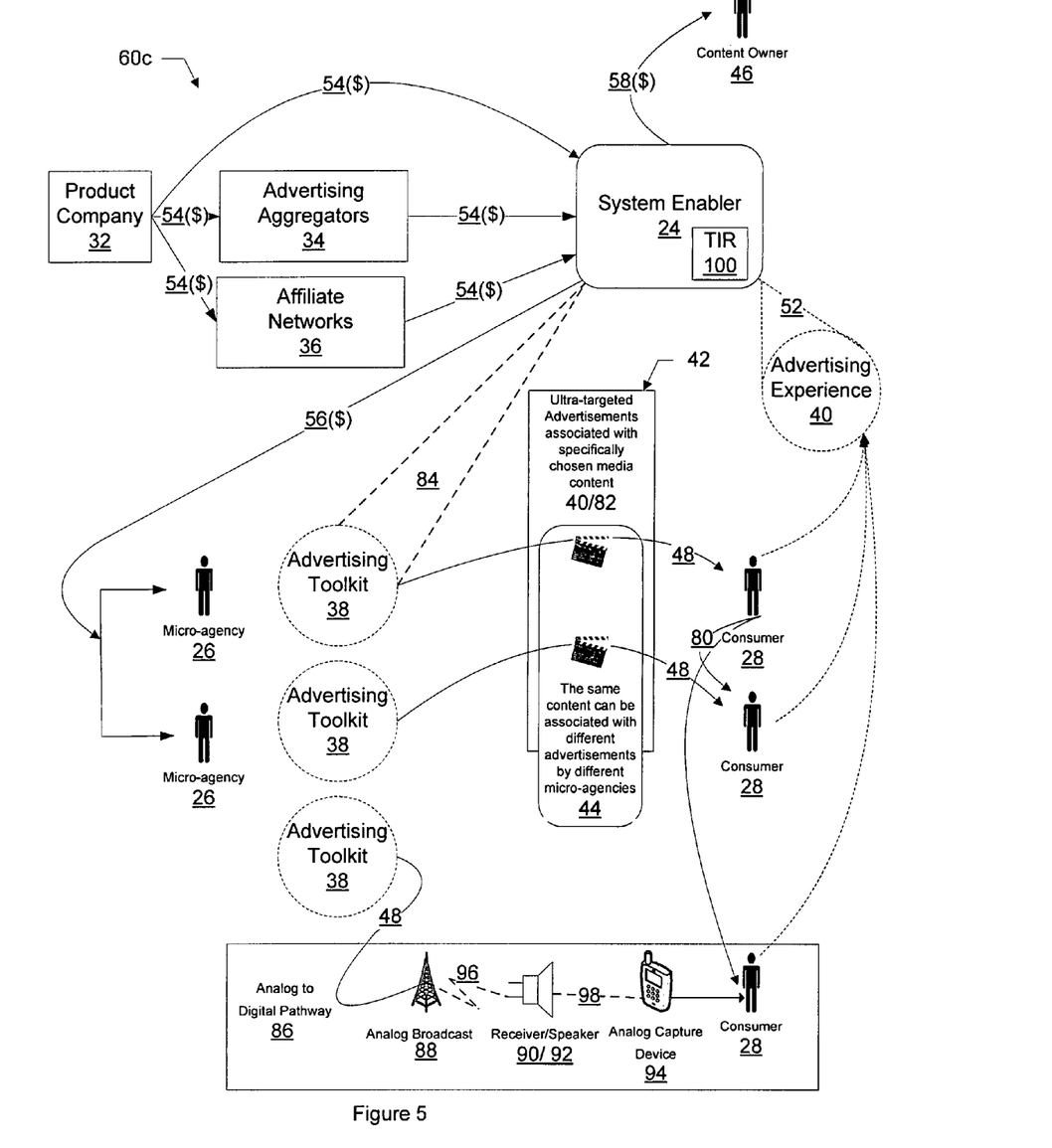
FIG. 5 is a diagram illustrating a universal advertising system according to another embodiment of the invention.

FIG. 5 shows a universal advertising system 60c according to another embodiment of the invention where the product company 32 provides payment 54 indirectly to the system enabler 24 through advertising aggregators 34 and affiliate networks 36. In addition to providing indirect payment 54 to the system enabler 24 through affiliates 36 and aggregators 34, the product company can also provide direct payment 54 to the system enabler 24. In the case of indirect payments, the aggregators 34 and affiliate networks 36 can decide what percentage of payment 54 is to be allocated to the system enabler 24 on a contractual basis.

FIG. 5 also shows multiple micro-agencies 26 associating different advertisements 40 or advertising links 82 through the use of an encoder 42, within the same media content 44. Therefore, micro-agencies 26 can target advertisements 40 or advertising links 82 at specific media content 44 that will result in the most completed compensable items 52 possible. The encoded advertising media content 48 is distributed to consumers 28 who may also distribute the encoded advertising media content 48 within their social networks 80.

FIG. 5 also shows an analog to digital pathway 86 having an analog broadcaster 88, a receiver 90, a speaker 92, and an analog capture device 94. The micro-agencies 26 may send an encoded advertising media content signal 48 to an analog broadcaster 88. The analog broadcaster 88 broadcasts the media content signal 48 in analog or digital form that can be received by a receiver 90. The receiver 90 can be any device capable of receiving analog or digital signals such as a radio antenna and receiver system or a digital signal receiver within a computer, mobile device, audio capable consumer electronic device, or computer network. If the receiver 90 receives a digital signal, a digital to analog converter can be used to convert the signal to an audible signal 98. The audible signal 98 can be captured by an analog capture device 94 such as a cell phone, computer, mobile device, audio capable consumer electronic device, personal digital assistant device (PDA), or any other device capable of processing an audible signal 98.

Once the analog capture device 94 processes the analog signal 98, the analog capture device 94 decodes the media content signal 48 which has an identifier such as an advertising link 82 or an advertising experience 40 embedded in the analog signal 98. The processing and the decoding step can be accomplished by utilizing the decoder 50 if a watermark is encoded in the media content signal 48. The watermark survives the digital to analog conversion and can be processed by the analog capture device 94. If the media content signal 48 contains an advertising link 82, the analog capture device 94 will launch a web application or a viewing environment containing the advertising experience 40 for the consumer 28 to interact with and create completed compensable items 52. Any completed compensable items 52 will be tracked and recorded by the system enabler 24 in the same manner as described in other embodiments of the invention. The system enabler 24 can provide a TIR 100 based on logged information as previously described.

One advantage in the universal advertising system 60, is that an unlimited number of micro-agencies 26 or agents choose what they want to advertise as opposed to a handful of advertising agencies. Micro-agencies 26 alone determine the advertisement 40 linking without consent of the product company 32 which provides the micro-agency 26 with enough flexibility to adapt to explosive niche markets that are possibly limited in time. Unlike traditional advertising systems, the universal advertising system 60 possesses unlimited niche differentiation and micro-agencies 26 alone determine product branding specific to the niche that they are targeting.

Furthermore, advertisements 40 can be associated with any kind of content, including arcane user-generated content. Product companies 32 currently have no way of selling to a niche that the product company 32 does not know about. In contrast, the universal advertising system 60 allows products to be presented to interested niches by niche members (micro-agencies 26) themselves. In this system 60, the product company 32 has no need to know beforehand that a given niche is interested in their product. With the help of super-distribution via social networks 80, the consumers 28 will determine on a dynamic basis which advertisements 40 and media content 44 is most interesting to them. The universal advertising system 60 allows revenue sources 22 to profit from social network distribution 80 of media content 44.

Another advantage of the universal advertising system 60 is that watermarks that qualify as compensable through the system enabler 24 can be changed fairly easily. For instance, if a watermark were somehow compromised or "hijacked", the micro-agencies 26 and system enabler 24 can deactivate the compromised watermark quickly while switching to another new and uncompromised watermark.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer-implemented method comprising:
   transmitting, by the computer to a micro-agency, a watermark encoder to embed a digital identifier within media content to create embedded advertising content;
   receiving, by the computer from the micro-agency, a registration of the embedded advertising content, wherein the micro-agency embeds the media content with the digital identifier and transmits the embedded advertising content to a client, the client using a watermark decoder to extract the identifier from the embedded advertising content and display an advertisement using the digital identifier;
   receiving, by the computer, tracked client interactions with the advertisement displayed in response to the client extracting the identifier; and
   comparing, by the computer, the tracked client interactions to compensable action items.

2. The method as claimed in claim 1, further comprising:
receiving compensable action items from at least one revenue source; and
updating at least one of a system enabler account, a micro-agency account, and a media content owner account based on the tracked client interactions that are compared to the compensable action items.

3. The method as claimed in claim 1, wherein the identifier is at least one of an advertising link, existing advertising content, and newly created advertising content.

4. The method as claimed in claim 1, wherein the watermark encoder is provided in a toolkit being used by the micro-agency.

5. The method as claimed in claim 1, further comprising creating a triggered information report containing at least one of user identification, watermark identification, viewing device identification, and advertising experience identification information.

6. The method as claimed in claim 4, wherein the micro-agency is at least one of an organization, an individual advertising creator, and a content owner.

7. The method as claimed in claim 4, wherein the micro-agency generates revenue through embedding identifiers within media content remotely and without direct consent from a revenue source or content owner in order to target niche markets that are difficult to reach.

8. The method as claimed in claim 1, wherein the media content is at least one of audio and visual content.

9. The method as claimed in claim 1, further comprising providing an analog to digital pathway that allows the broadcasting of an embedded advertising content signal that can be captured by an analog capture device.

10. The method as claimed in claim 9, wherein the analog capture device is at least one of a cell phone, computer, mobile device, audio capable consumer electronic device, and personal digital assistant device.

11. The method as claimed in claim 1, wherein the client interaction is at least one of impressions, click-throughs, and purchases.

12. The method as claimed in claim 11, wherein the impressions include at least one of printing, saving, searching, and transmitting the advertising experience.

13. The method as claimed in claim 2, wherein the at least one revenue source is at least one of a product company, an aggregator, and an affiliate network.

14. A system for linking content comprising:
a processing device executing a system enabler to transmit a toolkit to a micro-agency, wherein the toolkit includes a watermark encoder to embed digital identifier within media content to create embedded advertising content, wherein the system enabler includes
a registration module to receive and register the embedded advertising content, wherein the micro-agency embeds the media content with the identifier and transmits the embedded advertising content to a client, the client using a watermark decoder to extract the identifier from the embedded advertising content and display an advertisement using the digital identifier,
a tracking module to receive information and create tracked client interactions in response to client interactions with the advertisement displayed in response to the client extracting the identifier, and
a payment module to receive a compensable action item from a revenue source.

15. The system as claimed in claim 14, wherein the payment module compares the tracked client interactions with the compensable action item to update at least one of a system enabler account, a micro-agency account, and a media content owner account.

16. The system as claimed in claim 14, wherein the identifier is at least one of an advertising link, existing advertising content, and originally created advertising content.

17. The system as claimed in claim 16, wherein the advertising toolkit is at least one of software, plug-ins, and enhancements to authoring tools that contains the watermark encoder.

18. The system as claimed in claim 14, wherein the system enabler assembles triggered information reports containing at least one of user identification, watermark identification, viewing device identification, and advertising experience identification information.

* * * * *